D. D. CURETON, Jr.
AUTOMATIC STOP OIL GAGE.
APPLICATION FILED MAY 11, 1920.
1,395,095.
Patented Oct. 25, 1921.
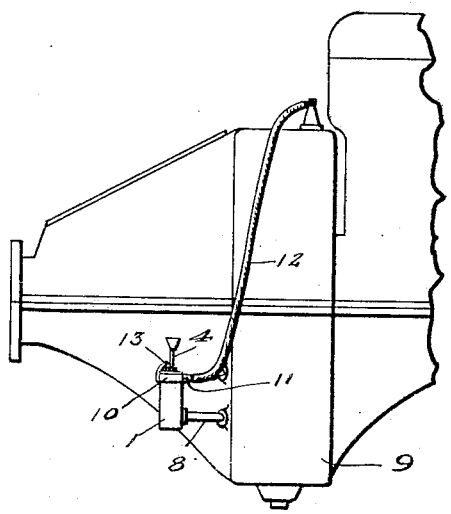
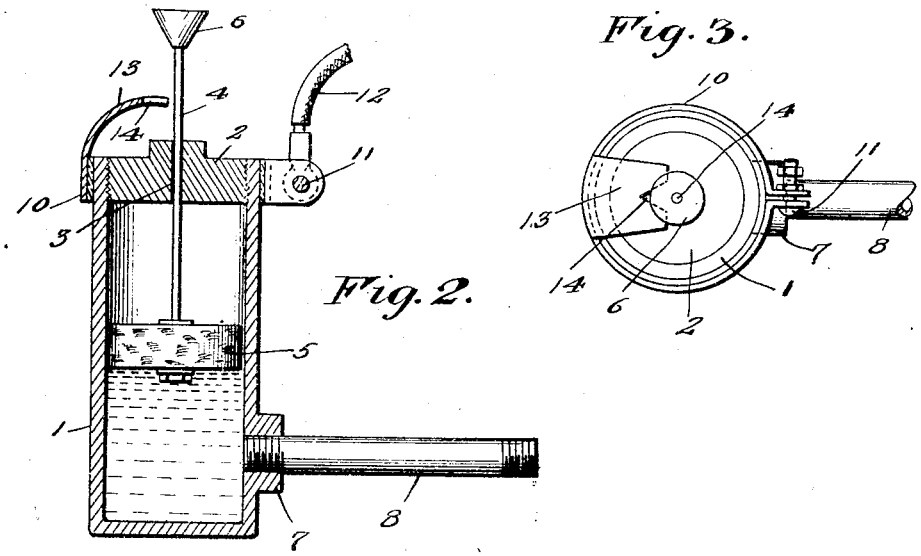

UNITED STATES PATENT OFFICE.

DAVID D. CURETON, JR., OF TALLAHASSEE, FLORIDA.

AUTOMATIC-STOP OIL-GAGE.

1,395,095.

Specification of Letters Patent.

Patented Oct. 25, 1921.

Application filed May 11, 1920. Serial No. 380,688.

*To all whom it may concern:*

Be it known that I, DAVID D. CURETON, Jr., a citizen of the United States, residing at Tallahassee, in the county of Leon and State of Florida, have invented new and useful Improvements in Automatic-Stop Oil-Gages, of which the following is a specification.

This invention relates to an oil gage for the crank case of an automobile and the like and the principal object of the invention is to provide means whereby the ignition system of the automobile will be short circuited when the oil in the crank case reaches a low level.

Another object of the invention is to provide means whereby the level of oil in the crank case will be indicated by a float device.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view showing the device attached to a crank case of an automobile.

Fig. 2 is a longitudinal section through the device itself.

Fig. 3 is a top view of the device.

In these views 1 indicates a cylinder which has its upper end closed by a screw threaded plug 2, said plug having a hole 3 therein through which passes a stem 4 which at its lower end carries a float 5. The upper end of this stem is provided with a head 6. The lower part of the cylinder has a nipple 7 which is connected by a pipe 8 with the crank case 9 of the automobile. In attaching my device I may remove the lower pet cock which is arranged in the crank case and connect the pipe 8 with the hole made for this cock. Thus the oil in the crank case will be free to enter the cylinder and raise the float so that the position of the head 6 will indicate the level of oil within the crank case. I place a split ring 10 around the upper end of the cylinder and insulate said ring from the cylinder by any suitable means. The ends of the ring are provided with holes to receive the bolt 11 and this bolt also acts to hold the end of the conductor 12 which leads to the magneto terminal. An arm 13 is connected with said ring and this arm is curved inwardly so that its upper end will lie under the head. I may notch this end of the arm as shown at 14 to receive the head when the float drops.

When the level of oil in the crank case reaches a certain low level the float will drop and bring the head 6 in contact with the arm 13. Thus the magneto will be short circuited through the wire 12, the ring 10, arm 13, head 6, stem 4 and the cylinder and pipe and the parts of the car so that the motor will be stopped. If it is desired to use the automobile without adding more oil this can be done by detaching the wire 12.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a cylinder, means for connecting the same with the crank casing, a float in said cylinder, a headed stem connected with the float and passing through the top of the cylinder, a split ring carried by the upper end of the cylinder and insulated therefrom, a screw for clamping the ring on the cylinder, a conductor having one end engaging said screw and a curved arm on said ring adapted to be engaged by the head on the stem when the oil in the crank case reaches a certain low level.

In testimony whereof I affix my signature.

DAVID D. CURETON, JR.